United States Patent [19]

Wilhelm

[11] Patent Number: 5,786,642
[45] Date of Patent: Jul. 28, 1998

[54] MODULAR POWER MANAGEMENT SYSTEM AND METHOD

[75] Inventor: William George Wilhelm, Mastic, N.Y.

[73] Assignee: Nextek Power Systems Inc., Shirley, N.Y.

[21] Appl. No.: 606,219

[22] Filed: Mar. 7, 1996

Related U.S. Application Data

[63] Continuation-in-part of Ser. No. 328,574, Oct. 24, 1994, Pat. No. 5,500,561, which is a continuation of Ser. No. 129,575, Sep. 29, 1993, abandoned, which is a continuation of Ser. No. 944,796, Sep. 15, 1992, abandoned, which is a continuation of Ser. No. 638,637, Jan. 8, 1991, abandoned.

[51] Int. Cl.$^6$ ............................................. H02J 1/00
[52] U.S. Cl. ....................... 307/72; 307/75; 307/64; 361/648; 361/622
[58] Field of Search .......................... 307/11, 18, 19, 307/20, 21, 22, 23, 24, 25, 26, 27, 28, 29, 31, 38, 39, 43, 44, 45, 46, 48, 66, 64, 80, 85, 86, 87, 149, 150, 72, 75; 361/601, 602, 611, 622, 627, 641, 648, 652, 728

[56] References Cited

U.S. PATENT DOCUMENTS

| | | | |
|---|---|---|---|
| 2,194,822 | 3/1940 | Dannheiser | 171/97 |
| 4,206,608 | 6/1980 | Bell | 60/698 |
| 4,315,163 | 2/1982 | Bienville | 307/66 |
| 4,349,863 | 9/1982 | Petersen | 362/20 |
| 4,426,587 | 1/1984 | Nouet | 307/66 |
| 4,464,724 | 8/1984 | Gurr et al. | 364/492 |
| 4,508,996 | 4/1985 | Clegg et al. | 315/224 |
| 4,551,980 | 11/1985 | Bronicki | 60/698 |
| 4,630,005 | 12/1986 | Clegg et al. | 331/113 |
| 4,663,723 | 5/1987 | Umeda | 364/492 |
| 4,682,078 | 7/1987 | Pascalide | 315/86 |
| 4,731,547 | 3/1988 | Alenduff et al. | 307/85 |
| 4,742,291 | 5/1988 | Bobier et al. | 320/39 |
| 4,821,166 | 4/1989 | Albach | 363/89 |
| 4,860,185 | 8/1989 | Brewer et al. | 363/41 |
| 4,894,764 | 1/1990 | Meyer et al. | 363/65 |
| 5,053,635 | 10/1991 | West | 307/67 |
| 5,089,937 | 2/1992 | Carrubba et al. | 361/732 |
| 5,289,045 | 2/1994 | Lavin et al. | 307/64 |
| 5,500,561 | 3/1996 | Wilhelm | 307/64 |
| 5,532,525 | 7/1996 | Kaiser et al. | 307/64 |

*Primary Examiner*—William M. Shoop, Jr.
*Assistant Examiner*—Jonathan S. Kaplan
*Attorney, Agent, or Firm*—Alfred M. Walker

[57] ABSTRACT

An electrical distribution system and method has storage battery mechanism of very large equivalent capacitance providing excellent ripple filtering and an ideal path to ground, and filter capacitor mechanism of microfarad size providing DC blocking and limited AC path to ground. The storage battery entity is maintained as to its charge by DC supply which provides regulated DC power in which switching regulation may be involved. The system and method provides dual voltage capability, both DC and AC in which circuit breakers may be ganged for simultaneous tripping, and in which intrinsic DC circuit(s) may be looped to increase current-carrying capability.

24 Claims, 4 Drawing Sheets

MODULAR POWER MANAGEMENT SYSTEM AND METHOD

CROSS REFERENCE TO RELATED APPLICATIONS

This application is a continuation-in-part of my copending application Ser. No. 08/328,574 filed Oct. 24, 1994 and which will issue as U.S. Pat. No. 5,500,561 on Mar. 19, 1996; which was a file-wrapper continuing application of application Ser. No. 08/129,575 filed Sep. 29, 1993, now abandoned; which in turn was a file-wrapper continuing application of application Ser. No. 07/944,796 filed Sep. 15, 1992, now abandoned; which in turn was a file-wrapper continuing application of my original application Ser. No. 07/638,637 filed Jan. 8, 1991 and now abandoned.

The disclosures of U.S. Pat. No. 5,500,561 and my prior applications are incorporated herein by reference thereto.

BACKGROUND AND BRIEF SUMMARY OF THE INVENTION

In view of the confusion and oft-times misleading and even incorrect usage of some electrical terms in the patent as well as the technical literature, and to distinguish even from terms which may have been loosely employed in my U.S. Pat. No. 5,500,561, the terms "inverter" or inverter means, "converter" or converter means, and "intrinsic DC load" or intrinsic DC load means shall now be defined insofar as usage in this CIP disclosure is concerned. That is to say, inverter or inverter means shall mean a device, circuit or system that delivers AC power when energized from a source of DC power i.e., it is the opposite of rectification; converter or converter means shall mean a device, circuit or system that both receives and provides DC power in which AC is generated as an intermediate process in the flow of energy; and the term intrinsic DC load or intrinsic DC load means shall mean a DC device, circuit or system which functions as a DC load in response to DC power input thereto.

My aforesaid U.S. Pat. No. 5,500,561 is directed to A CUSTOMER SIDE POWER MANAGEMENT SYSTEM AND METHOD and discloses several embodiments wherein substantial relaxation is achieved in the requirement that an electric or public utility maintain a generating capacity far exceeding the anticipated maximum demand for electricity. Generally speaking, my patent and prior applications are directed to systems wherein a direct current power supply means in the form of storage battery means is included in the power management system and operates to alleviate excessive power demands on the electric utility.

Briefly stated, the problem addressed in my copending applications is, at its heart, based upon the fact that power demands placed upon the electric utilities by consumers fluctuate enormously dependent upon the time of day, the day of the week, the season of the year and/or any other factor which may affect demand, including the type of consumer. So-called uninterruptible power supplies have been proposed but are generally inadequate to alleviate the problem in a proper and efficient manner. Such a system is exemplified by the Lavin et al U.S. Pat. No. 5,289,045 of Feb. 22, 1994 and attention is called to the references cited as prior art against my aforesaid prior applications.

This CIP application relates to electrical distribution generally and in particular to electrical distribution as it applies particularly to dwellings for example, wherein it is well known that electrical energy is distributed from a public or electric utility in AC form, normally in split-phase having the meaning that two 120 V AC phases of the utility are brought into a building so as to be available as two 120 V AC circuits and a 240 V AC circuit. Such a three-wire system involves the use of two line power conductors and a neutral wire conductor supplied by the utility. These conductors, according to usual practice, are brought into the customer's distribution box and connected therein to two line power busses through suitable circuit breaker means and directly to a neutral buss housed within the box. The box also houses a ground buss which, according to normal practice, is provided with a wire connection extending externally of the box and into electrical connection with an earthing pole which establishes earth potential at the ground buss.

This CIP application is directed to the problem of efficiently using and/or utilizing electrical power and to the method thereof, more specifically, of efficiently utilizing DC power at the site of interest by establishing a dual voltage capability at such site.

An object of this invention is to permit two different power supply systems, one DC and the other AC, to reside on common building wiring as found in the United States and elsewhere in the world.

Another object of this invention is to provide a compatible power wiring system that allows both DC power operation and AC power operation to coexist, without modification to the power wiring system, from common building wiring power outlets. This compatibility allows, for example, appliances which operate on low voltage 24 V DC, especially those which now do or in the future will function as intrinsic DC loads or intrinsic DC load means, and those which operate as conventional 120 V AC appliances, to be used within the same building space and with existing cabling or wiring.

Another object of this invention is to introduce the concept of ganged circuit breaker means in power wiring systems.

Still another object of this invention is the provision of dual voltage capability with ganged circuit breaker means functioning to interrupt not only both the "high" and "low" sides of AC voltage circuitry but DC circuitry as well.

Stated otherwise, the preceding object may utilize one circuit breaker means in an AC path and a second circuit breaker means in a DC current path as well.

Still another object of this invention is to provide an intrinsic DC load means that embodies looping of the wiring through one circuit breaker means connecting to one side of the DC power source and through a second circuit breaker means to the other side of the DC power source.

A further object of this invention is to provide apparatus that requires only a simple input connection after the electric distribution box of living quarters or of a dwelling (either mobile or not) such that it will function in a variety of different ways which permit stand alone function with DC energy input from a plurality of DC power source means i.e., from generator means, photo-voltaic means, wind turbine means, and etc.

A further object of the invention is to provide the combination of filter capacitor means and storage battery means disposed in electrical parallel, the filter capacitor means functioning as a limited AC path to ground, sized, in capacitance to assure a low impedance path to ground at 60 Hz, the storage battery means functioning to conduct current in opposite directions, consistent with the requirements for AC conduction to ground. That is, the storage battery means and its associated DC power supply provide both a DC isolation path to ground and an AC continuity path to ground whereas the filter capacitor means supplies a limited AC path to ground.

A further object of this invention is to provide a system in conformity with the preceding object wherein the filter capacitor means is hard wired within the electrical distribution box and the storage battery means is housed within the module unit of this invention.

Another object of the invention is to provide the combination of an electrical distribution box housing neutral buss means, power buss means, ground buss means and filter capacitor means, the latter being of limited capacitance and little bulk so as to provide a limited AC path to ground, and a modular power system module unit which houses storage battery means of substantial capacitance and large bulk compared with said filter capacitor means so as to conduct current in opposite directions to provide for AC conduction to ground.

Another object of the invention is to provide a practical approach to the application of building-side DC power for intrinsic DC devices or loads.

It is a further object of this invention to minimize a customer's peak power demands by using a storage battery means for peak clipping and valley filling purposes.

Another important object of this invention is to provide a modular unit in which the modular unit comprises storage battery means for providing a battery equivalent capacitance which is very large in capacitance and bulk in combination with voltage regulator means or with converter means for controlling the charge level of the storage battery means.

Another object of this invention is to provide a system in accord with the preceding object in combination with intrinsic DC load means for utilizing the storage capacity of the storage battery means.

Another object of this invention is to provide a modular system using a rechargeable storage battery means as part of a critical conversion circuit for filtering and voltage regulation (which may involve a converter) to protect the storage battery means from damage by overcharging or undercharging and in which the storage battery means supplies power to an intrinsic DC load means.

Still another object of the invention is to provide the combination of an electrical distribution box housing neutral buss means, power buss means, ground buss means and filter capacitor means, the latter being of limited capacitance and little bulk so as to provide a limited AC path to ground and be DC blocking, and a modular power system module unit which houses storage battery means of substantial capacitance and large bulk compared with said filter capacitor means, and intrinsic DC load means for drawing upon the storage capacity of said storage battery means.

A further object of this invention involves the battery equivalent capacitance of said storage battery means being very large consistent with an ideal AC path to ground and the capacitance of said filter capacitor means being very small consistent with a limited AC path to ground but large enough to pass sufficient current to keep the worse case fault currents well below any shock hazards and to allow sufficient current flow to trip relevant circuit breakers in the event of a short circuit.

It is an object of this invention to provide an arrangement in accord with the preceding object in combination with converter means in which high frequency AC is generated as an intermediate process in the flow of energy and in which special capacitor means is provided for absorbing voltage spikes of said high frequency AC.

BRIEF DESCRIPTION OF THE DRAWING FIGURES

Figure 3:
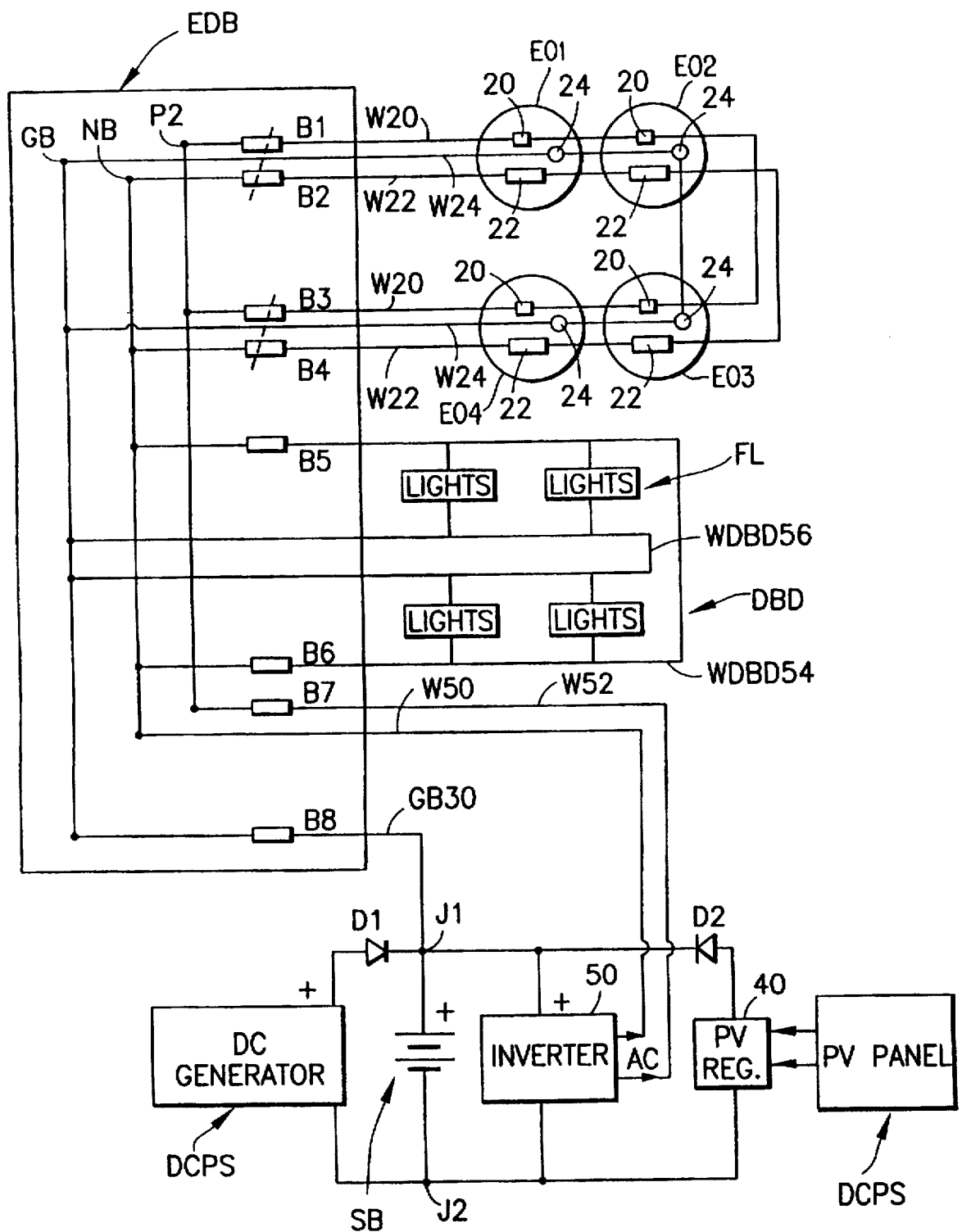
Figure 4:
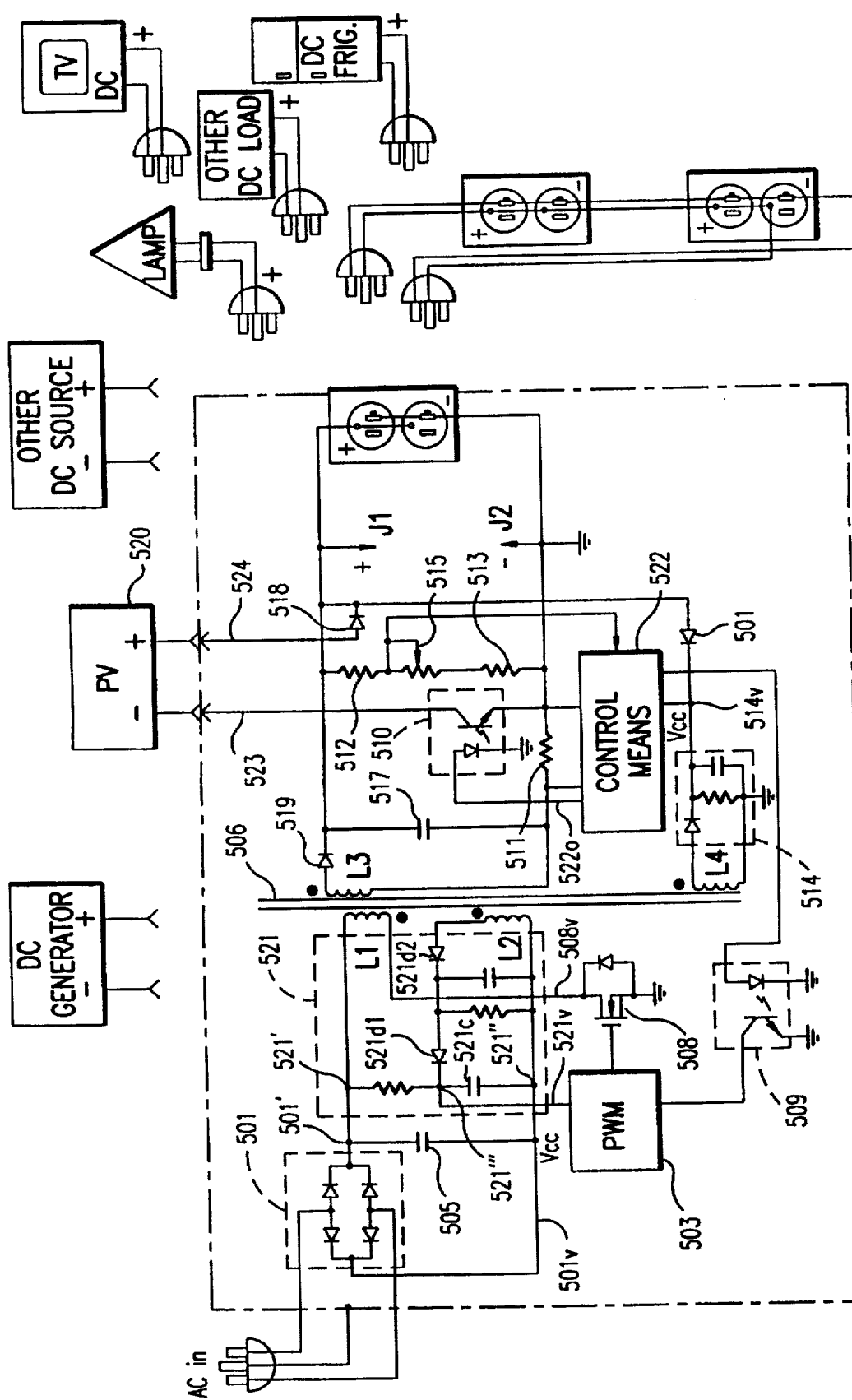

FIG. 3 illustrates the use of circuit breaker means and the looping of a DC lighting circuit as well as auxiliary DC equipment and an inverter associated with a simplified illustration of the electric distribution box; and FIG. 4 illustrates a converter fed by the DC supply from a rectifier and providing an output to storage battery means illustrated as having a filter capacitor in electrical parallel therewith.

DETAILED DESCRIPTION OF THE INVENTION

FIG. 1

Figure 1:
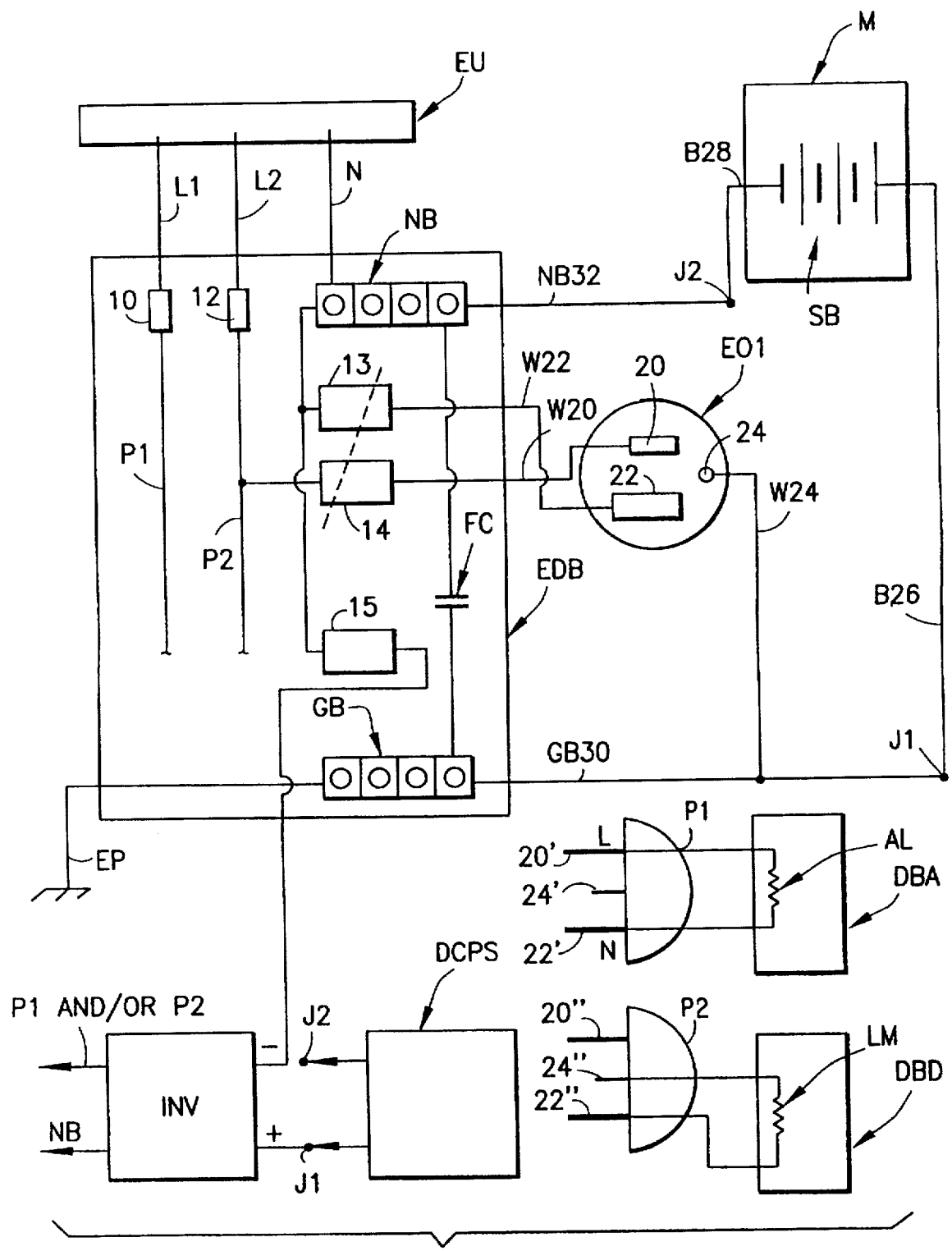
FIG. 1 illustrates the dual voltage concept of the invention, the ganged circuit breaker means concept and the modular concept thereof.

Reference is had at this time to FIG. 1 which shows a partial circuit diagram of this invention, illustrating a conventional three-wire or split-phase system comprised of the electric utility power line wires L1 and L2 and the neutral wire N as may be supplied from an electric utility EU and extending into the electrical distribution box EDB of an abode, dwelling or the like (which may be mobile or not), which box is shown in rather simplified form. Suffice it to say that the box EDB is provided with conventional knock-out openings through which the cables or wires from the utility or to and from other entities are passed, the wires L1 and L2 being connected to the power company or electric utility circuit breakers 10 and 12 whereby the internal power busses P1 and P2 and the dwelling circuits AL in the AC distribution box DBA and the dwelling circuit intrinsic load means LM in the DC distribution box DBD to which they are connected are protected from excessive voltages or surges emanating from the utility EU. The neutral wire N is connected internally to the neutral buss NB which is isolated from direct connection to the internal ground buss GB of the distribution box EDB.

A conventional electrical outlet EO1 is shown whose electrical plug openings 20, 22 and 24 are shown to be connected by wires W20, W22 and W24 passing through suitable knock-out openings in the box EDB and into connection with the circuit breaker 14, the neutral buss NB and the ground buss GB, respectively. It will be appreciated that the circuit breakers 10 and 12 referenced above are of conventional type in that they snap into place when the conventional hinged front panel of the box EDB is swung aside to expose any circuit breakers housed within the box. This is much preferred to the older screw-threaded fuse receptacles. At any rate, the modular feature of this invention involves the use of the storage battery means SB having its positive terminal connected by the wiring B26 having a junction J1 with the ground buss wiring GB30 which passes into the box EDB into connection with the ground buss GB as illustrated. The negative terminal of the storage battery means SB is connected by the wiring B28 whose junction J2 with the neutral buss wiring NB32 connects internally of the box EDB to the neutral buss NB as shown.

Since the wire connections W20, W22 and W24 are as shown, the prongs 20', 22' and 24' of the electric plug PL1 may be used to feed the AC loads AL powered by the box DBA. Similarly, The electric plug PL2 may be used to feed the intrinsic DC load means LM powered by the box DBD.

FIG. 1 illustrates a basic modular unit M which is external to the box EDB and therefore attains some surprising advantages which will now be explained. The basic modular unit M comprises the rechargeable storage battery means SB which represents the battery storage capacity to be drawn upon when DC power is not otherwise available to the consuming load. The storage battery means SB is chargeable in deep cycle fashion to a charge value at which an incipient electrolyte boiling point is reached and the battery charging means employed must be capable of effecting such charge value as will ensure this level of charge without either overcharging or undercharging.

An important aspect of this invention resides in the compound use of the "battery equivalent capacitance", inherent with the storage battery means SB, in conjunction with the filter capacitor FC. The magnitue of the "battery equivalent capacitance" gain per unit volume exhibited by the storage battery means SB is outstanding. To illustrate this point, a standard filter capacitor FC might have a capacitance measured in microfarads (say 50 microfarads) and be of a bulk or volume to fit easily within the box DB. The storage battery means will have a battery equivalent capacitance of at least 10,000 Farads. The high battery equivalent capacitance of the storage battery means is highly effective for AC ripple filtering but the bulk is too high for incorporation within the box EDB and, more importantly, it provides an ideal AC path to ground. If the storage battery means SB were to be removed, even temporarily, the limited AC path to ground supplied by the filter capacitor FC would be inadequate to provide an adequate AC path to ground, however, the presence of the DC power source DCPS, or its equivalent, provides the adequate path. By substituting a 12 volt deep cycle lead-acid battery means SB of say, 1 cubic foot volume, the relative "battery equivalent capacitance" would be at least 10,000 Farads. Stated otherwise, such storage battery means SB would provide a very large and adequate AC path to ground commensurate with the load current being drawn and the limited AC path to ground afforded by the filter capacitor FC would still be essential to comply with local electrical codes. The two capacitors operate in conjunction with one another and both are essential for complying with local codes, the means SB conducting current in opposite directions consistent with the requirements for AC conduction to ground and its associated DC power supply additionally providing a DC isolation path from ground, and the means FC providing a second, but limited, AC path to ground in the event that the means SB becomes disabled. In regard to the latter, the means FC is sized in capacitance wherein the capacitive reactance Xc is low enough to pass sufficient current to keep both the worst case fault currents well below any shock hazards and to allow sufficient current flow to trip the relevant circuit breaker(s) in the event of an appliance short circuit.

It will be appreciated that although the filter capacitor FC normally would be hard wired within the box EDB, it could be incorporated within the module M in parallel with the storage battery means.

As will be seen, AC potential is available at the wirings W20 and W22 because the power buss P2 is supplied with AC power and DC potential is available at the wirings W22 and W24 because of the presence of the storage battery means SB. Therefore, the plug openings 20 and 22 may be connected to the AC load means AL of the distribution box DBA through the prongs 20' and 22' of the electric plug PL1 and the plug openings 22 and 24 may be connected to the intrinsic DC load means LM of the electric distribution box DBD through the prongs 22" and 24" of the electric plug PL2.

As noted before, the illustration of FIG. 1 is somewhat simplified because only one AC power buss P2 is connected although other and different connections could be illustrated and only one DC power availability is illustrated between the wirings W22 and W24 although the electrical outlet EO1 could be much more complex and offer a great deal more in the way of AC and DC power capabilities. Such will be illustrated in greater detail hereinafter.

FIG. 2

Figure 2:
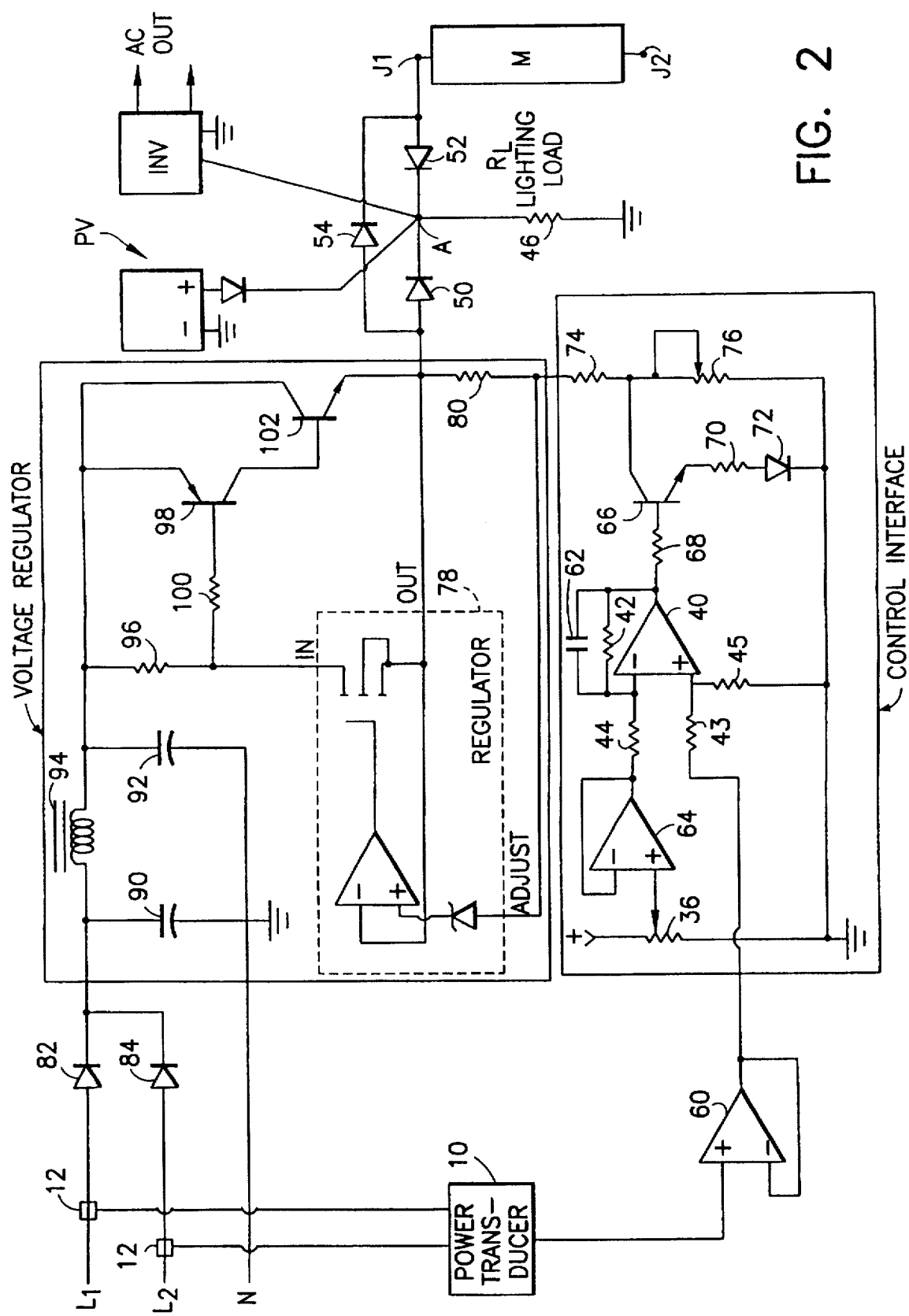
FIG. 2 illustrates the invention with regard to incorporation of the linear voltage regulator and control interface of my copending application as one means for controlling the charge level of the storage battery means.

With reference to FIG. 2, note that the circuit shown largely parallels FIG. 3 of my copending application wherein rectification is effected by the diodes 82 and 84 they feed the TEE circuit 94, 90, 92 of the voltage regulator section (so labelled) operating in conjunction with the control interface (so labelled) to output DC at the junction A. Thus, an important objective of this invention is realized, namely, that the charge level of the storage battery means SB to service an intrinsic DC load means such as 46 in FIG. 2 or the electronically (DC) ballasted fluorescent lighting circuit FL in FIG. 3, is maintained at the desired level. Note that the three modes of operation as disclosed in U.S. Pat. No. 5,500,501 obtain.

When AC input is present, the voltage regulator function illustrated in FIG. 2 is one means for maintaining the charge level of the storage battery means SB, contained within the module M and which is connected to the junctions J1 and J2 (see FIG. 1). The lighting load 46 is, of course, an intrinsic DC load means such as the looped LIGHTS circuits FL looped between the ground buss GB and the circuit breakers B5 and B6 which are connected to the neutral buss NB as in FIG. 3. The DC power source DCPS of FIG. 1 is the photo-voltaic panel means PV of FIG. 2 and the inverter means INV is shown in both FIGS. 1 & 2. It will also be understood that although the electric distribution box EDB is not illustrated fully in FIG. 2, this is done for simplicity to avoid overcrowding of the Figure.

FIG. 3

FIG. 3 shows the electric distribution box EDB in simplified and uncluttered form and is principally directed to illustrating the concept of ganged circuit breakers and of looping of an intrinsic DC load means as well the use of a load source means. The box EDB is outlined and the ground buss GB, the neutral buss NB and the power buss P2 are all designated. The DC ballasted fluorescent lighting intrinsic DC load means FL comprises an example of a distributor box DBD emanating from the box EDB. Each looping WDBD54 and WDBD56 is between the neutral buss NB (−DC) through the circuit breaker means B5 and B6 to the ground buss GB (+DC). Four electrical outlet means EO1, EO2, EO3 and EO4 are illustrated, all identical, with the two wirings W20 connected with the power buss P2 through the respective circuit breaker means B1 and B3. Similarly, the two wirings W22 are connected with the neutral buss NB through the respective circuit breaker means B2 and B4. The two circuit breakers B1 and B3 each correspond to the circuit breaker 14 in FIG. 1 whereas the two circuit breakers B2 and B4 each correspond to the circuit breaker 13 in FIG. 1. The circuit breakers B1 and B2 "belong" to an AC path and a DC path, respectively, and the circuit breakers B3 and B4 similarly "belong".

Electric plugs PL1 and/or PL2 may be plugged in to the electric outlets with their prongs 20', 22', 24' and/or 20", 22", 24" as previously described.

The DC power sources DCPS are illustrated as the DC generator and the photo-voltaic panel means PV which, after regulation at the regulator 40, passes through the isolating diode D2 to the junction A to which the positive side of the DC generator DCPS is connected through the isolating diode D1. The junction A is connected to the ground buss GB through the circuit breaker B8 whereas the AC input from the inverter 50 is connected to the neutral buss NB by means of the wiring W50 and to the circuit breaker B7 through the wiring W52. The looping of the intrinsic DC load means effectively doubles the current carrying capacities of the associated wirings whereas the ganging of the AC and DC paths as to circuit breaker means allows the dual voltage aspect to be carried out with increased safety.

To reiterate some of the above, the modular concept of this invention is very important in that it involves the provision of separate entities which are the storage battery means SB and the filter capacitor means FC. The storage battery means SB has a very large battery equivalent capacitance consistent with an excellent AC path to ground and the filter capacitor means FC has a very small capacitance consistent with a limited AC path to ground and being sized in capacitance wherein the capacitive reactance Xc is low enough to pass sufficient current to keep both the worst case fault currents well below any shock hazards and to allow sufficient current flow to trip the relevant circuit breaker(s) in the event of an appliance short circuit. As noted, the capacitance of the filter capacitor FC should be in the order of 50 microfarads.

FIG. 4

FIG. 4 is directed to a circuit which embodies a switching type converter of very high efficiency and is a preferred form of converter because this type of DC-to-DC power supply represents high efficiency contemporaneously possible. FIG. 4 illustrates input mechanisms, some of which are not designated by reference characters but which are designated as to function, and also illustrates output mechanisms, none of which are designated by reference characters but which are designated as to function. In all such cases, the meanings should be clear and the additional descriptive material detailing the mechanisms and reference characters are believed to be unnecessary.

The block enclosed in dashed lines and designated by the reference character 501 is a typical full wave rectifier bridge circuit (i.e., the opposite of an inverter) feeding the capacitor 505 at the junction 501' and whose purpose is to reduce the rectified ripple component of the circuit 501 and provide filtered DC input voltage, present between the junction 501' and the conductor 501v, to the converter means.

The converter circuit shown, downstream of and as fed by filtered DC from the rectifier circuit 501, has junctions 521' and 521" within the section 521 between which the resistor/capacitor pair 521r and 521c are connected and which pair provide the further junction 521'". The junction 521'" is connected to the conductor 521v which supplies the pulse width modulator 503 with positive voltage Vcc, and this junction feeds the diode 521d1 having junctions with the parallel resistor/capacitor pair which are connected between the diode 521d2 and the junction 521".

The converter employs a pulse width modulator PWM, indicated at 503, controlling the switching transistor circuit 508 to impress transient voltage spikes present on the conductor 508v through the primary of the transformer 506 to cycle current to the primary windings L1 and L2 of the transformer 506 whereby "ac is generated as an intermediate process in the flow of energy" as is defined in the above definition of "converter". The secondary side of the transformer 506 is represented by the windings L3 and L4.

The circuit 509 is an optical isolation link between the pulse width modulator 503 and the control means 522 on the secondary side of the transformer 506 which allows control voltage on the conductor 509v emanating from the pulse width modulator 503 on the primary side of the transformer 506 to provide an input to the control means 522 on the secondary side to influence the pulse width modulator PWM 503 without current leakage back from the secondary circuit. Typically, the frequency of conversion effected by the transformer 506 will be 20,000–100,000 Hz which dictates the need for the special capacitor 517 to absorb these transients, the capacitance of the capacitor 517 being typically about 1 microfarad when used.

A secondary winding L4 drives the circuit 514 which, similarly to the rectifier 501 plus the filtering of the capacitor 505, provides a DC output, in this case the proper DC input to the control means 522 at the conductor 514v. The control means 522 has an output conductor 522o connected to the optical link 510 for controlling the three modes of operation of voltage control in accord with the principles of my prior applications. That is to say, when the optical isolator 510 link is "on", modes which permit DC current to flow from the photovoltaic means 520 are operative, i.e., either or both DC power input from the means 520 alone and partial or shared DC power input from the means 520. When the optical isolator 510 link is "off", the remaining mode, DC power input solely from another source, (i.e., no photovoltaic input) is effected.

The modes are controlled by the DC voltage prevailing across the junctions J1 and J2 (or the presence of a rechargeable DC mechanism such as a storage battery means connected to these junctions) in which case, mode 1, DC power input to the rechargeable DC mechanism alone, mode 2, shared DC power input, and mode 3 no DC power input to the rechargeable DC mechanism are the order of the day. That is to say, when the conductors 523 and 524 are connected to one of the DC sources illustrated in FIG. 4, or to a DC power source such as DCPS in FIG. 1 or in FIG. 3, the system will be fully operative for the purposes intended.

Stated another way, the DC voltage applied to the storage means will depend upon the feed back influenced by the resistors 36, 42, 43, 44, 45, 68, 70, 74 and 76 in FIG. 2 or by the resistors including 511, 512, 513 and 515 in FIG. 4.

This is true even if the system according to this invention is operated on the barest of input. For example, in locations where either AC or DC power is available only part of the time, or is available on site only from mechanism thereat, some configuration disclosed in the drawing Figures herein will be effective to provide DC power supply to the storage battery means.

What is claimed is:

1. A modular power management system having common wiring for allowing both AC and DC power therethrough comprising:

an electrical distribution panel capable of receiving both AC and DC power simultaneously;

a system of busses housed within the panel including electrical power buss means, neutral buss means and ground buss means;

a module unit including DC power supply means external to the panel connected across said neutral buss means and said ground buss means within said panel;

means for delivering AC power to said power, neutral, and ground buss means within said panel;

means for delivering AC and DC power from said panel comprising an electric outlet having one receptacle connected to said AC power buss means, a second receptacle connected to said neutral buss means, and a third receptacle connected to said ground buss means;

means for selectively withdrawing AC or DC power for an external load from said electric outlet connecting said load to selected receptacles within said electric outlet; and circuit breaker means protecting said external load including circuit breakers ganged for simultaneous tripping of both AC power and DC power to receptacles connected to said neutral and AC power busses.

2. In a modular power management system as defined in claim 1 including said DC power supply means includes storage battery means.

3. In a modular power management system as defined in claim 2 wherein said DC power supply means further comprises a voltage regulator means for maintaining said DC power supply means within a desired voltage range.

4. In a modular power management system as defined in claim 2 wherein said DC power supply means is converter means.

5. A method of electrical distribution at a site which comprises the steps of:

providing both an AC and a DC power capability at said site, providing a common wiring system within said site having electrical lines sharing AC power and DC power passing therethrough, providing storage battery means for storing DC energy, supplying said storage battery means with DC power for maintaining the voltage level of said storage battery means not greater than fully charged as defined by the float potential of the storage battery used, providing circuit breaker means in said site ganged for simultaneous tripping of both AC power and DC power, and delivering AC power and/or DC power simultaneously through said common wiring at said site, and, selectively withdrawing AC and/or DC power for at least one external load at said site.

6. The method of electrical distribution at a site as defined in claim 5 further including the step of providing filter capacitor means in electrical parallel with said storage battery means, measuring the battery equivalent capacitance of said storage battery means so that the battery equivalent capacitance of said storage battery means is very large consistent with an ideal AC path to ground and the capacitance of said filter capacitor means is very small consistent with a limited AC path to ground but large enough to pass sufficient current to keep fault currents as determined by the ratings of the circuit breakers from constituting a shock hazard and to allow sufficient current flow to trip relevant circuit breakers during a short circuit, and passing current therethrough.

7. In a power management system, the combination of storage battery means and filter capacitor means for providing both an AC conduction path to ground and a DC isolation path from ground, said combination of storage battery means and filter capacitor means carrying AC power while isolating DC current and means for controlling a charge level of said storage battery means, said filter capacitor means providing a capacitance sized to carry AC current at 60 Hz and to insure a low impedance path to ground at 60 Hz and said storage battery means providing a capacitance sized to insure conduction to ground in either direction of current flow therethrough.

8. In a power management system as defined in claim 7 wherein said means for controlling said charge level of said storage battery means is a voltage regulator means with rectifier means providing DC input to said voltage regulator means.

9. In a power management system as defined in claim 7 wherein said means for controlling said charge level of said storage battery means is a converter means with rectifier means providing DC input to said converter means.

10. A power management system comprising the combination of an electrical distribution box and a modular unit, said electrical distribution box containing a common wiring system sharing separately or together at the same time both AC power and DC power therethrough, said box also housing power buss means, neutral buss means, ground buss means and an AC bypass filter capacitor means of relatively small capacitance and bulk connected between said neutral buss means and said ground buss means; said modular unit housing storage battery means for providing a battery equivalent capacitance and bulk which is very much greater than the capacitance and bulk of said AC bypass filter capacitor means and said storage battery means being housed within said modular unit and connected across said neutral buss means and said ground buss means.

11. The combination as defined in claim 10 including DC power supply means for supplying said storage battery means with DC energy, and DC load means connected between said ground buss means and said neutral buss means for supply by said storage battery means.

12. The combination as defined in claim 11 including ganged circuit breaker means ganged for simultaneous tripping of both high and low sides of AC voltage and DC power.

13. The combination as defined in claim 12 wherein said DC power supply means includes a device selected from the group consisting of fuel sourced electrical power generating means, photo-voltaic means, fuel cells, wind powered DC sources and hydro-electric DC sources.

14. The combination as defined in claim 10 including voltage regulator means for maintaining a charge level on said storage battery means and rectifier means for providing DC input to said regulator means.

15. The combination as defined in claim 14 including ganged circuit breaker means ganged for simultaneous tripping at both AC power and DC power.

16. The combination as defined in claim 15 wherein said DC power supply means includes a device selected from the group consisting of fuel sourced electrical power generating means, photo-voltaic means, fuel cells, wind powered DC sources, hydro-electric DC sources and energy converters that produce DC power.

17. The combination as defined in claim 10 including converter means for maintaining a charge level on said storage battery means and rectifier means for providing DC input to said converter means.

18. The combination as defined in claim 17 including ganged circuit breaker means ganged for simultaneous tripping.

19. The combination as defined in claim 18 wherein said DC power supply means includes a device selected from the group consisting of fuel sourced electrical power generating means, photo-voltaic means, fuel cells, wind powered DC sources, hydro-electric DC sources and energy converters that produce DC power.

20. In a power management system, the combination of DC power supply means and filter capacitor means for sharing both an AC conduction path to ground and a DC from ground, said combination of DC power supply means and filter capacitor means carrying AC power while isolating DC current, a common wiring system providing both AC power and DC power therethrough, said common wiring system sharing said AC and DC power separately or sharing both said AC power and DC power together at the same time, and means for controlling a voltage level of said DC power supply means, said filter capacitor means providing a capacitance sized to insure a low impedance path to ground at 60 Hz and said DC power supply means providing a capacitance sized to insure conduction to ground in either direction of current flow therethrough, said means for controlling said voltage level of said DC power supply means being effective to maintain said AC conduction path to ground if a storage battery means is not utilized within the system.

21. In a power management system as defined in claim 20 wherein said means for controlling said voltage level comprises a further DC power source means.

22. In a power management system as defined in claim 21 wherein said means for controlling said voltage level includes voltage regulator means.

23. In a power management system as defined in claim 21 wherein said means for controlling said voltage level includes converter means in which high frequency AC is generated as an intermediate process in the flow of energy.

24. In a power management system as defined in claim 23 including special filter capacitor means for absorbing voltage spikes of said high frequency AC.

* * * * *